United States Patent Office 3,639,325
Patented Feb. 1, 1972

3,639,325
POLYVINYL ACETATE LATEX WHITE PAINT BASE COMPOSITIONS CONTAINING A DISPERSANT FOR PAINT TINT COLORANTS
Donald L. Marion, Homewood, Dennis G. Anderson, Chicago, and Robert C. Strand, Homewood, Ill., assignors to Atlantic Richfield Company
No Drawing. Filed Mar. 15, 1968, Ser. No. 713,291
Int. Cl. C08f 3/70, 29/48; C09d 3/76
U.S. Cl. 260—29.6
4 Claims

ABSTRACT OF THE DISCLOSURE

Improved color development and a wide range of paint tint colorant compatibility is achieved in polyvinyl acetate latex white paint base compositions containing a white pigment and a dispersing agent, by the addition thereto of a small amount effective as a colorant dispersant, of an ammonium salt of a partial ester of a styrene-maleic anhydride polymer esterified to about 75 to 100% half ester with an alkylphenyl ether alcohol of the formula

R—C$_6$H$_4$—(OCH$_2$CH$_2$)$_x$—OH where R is alkyl of 8 to 9 carbon atoms and $x$ is 1 to 30, such as p-tertiary octylphenyl polyethoxy alcohol of 9 to 10 ethoxy groups, the styrene-maleic anhydride polymer prior to esterification containing a molar ratio of polymerized styrene to polymerized maleic anhydride of about 1:1 to 4:1, and preferably of about 1:1, and having an average molecular weight of about 600 to 5000, preferably about 1500 to 2000. Optimum color development is obtained when the dispersing agent comprises a small effective amount of an ammonium salt of a partial ester of the aforesaid styrene-maleic anhydride polymer esterified to about 75 to 100% half ester with an alkyl ether of ethylene glycol or of diethylene glycol, such as the monobutyl ether of ethylene glycol. This dispersing agent and the colorant dispersant can be mixed together to form an effective colorant tint paint dispersant composition for addition to polyvinyl acetate latex white paint base compositions. The paint tint colorant is subsequently added to the polyvinyl acetate latex white paint base composition containing the colorant dispersant resulting in excellent compatibility and color development.

---

This invention relates to polyvinyl acetate latex paint compositions. More particularly, this invention relates to polyvinyl acetate latex white paint base compositions containing colorant dispersions with improved compatibility and color development.

Within recent years the practice of tinting trade sales paints in the retail store at the time of purchase has become widespread. Either solvent-thinned (mineral spirits) or latex paints can be tinted to the desired color by using the same colorants. This is accomplished by machine-dispensing measured amounts of the universal colorants into a white paint base. Color development is achieved simply by mixing on a paint shaker.

There are a number of advantages obtained by employing a white paint base and coloring it with a universal colorant at the time of purchase in the retail store. Some of the more significant advantages which are realized with systems of this type are: (1) paint manufacturers can attain higher production volume, since some in-factory tinting is eliminated; (2) inventory of various colors for both the manufacturer and the retailer is simplified; (3) an extensive selection of paint colors is available and (4) aesthetic appeal to the consumer is developed since the color selection is a more unique or personalized choice.

Optimum color development is dependent on specific components present in each paint formulation, such as pigment dispersants, emulsifiers, and protective colloids. Paint formulations of each manufacturer must be specifically tailored to accept or be compatible with these colorants. Often the vehicle system in these colorants is based upon linseed oil which has been chemically modified to achieve hydrophilic characteristics. Performance requirements are stringent. Some of these universal colorants are offered in different series of various colorants each. Many of these universal colorants seek to achieve package stability and compatibility when used in both solvent-based and latex paints. Thus the hydrophilic-hydrophobic balance of the resin system and pigment dispersants used in these color systems are important. Heretofore, various latex paint formulations have sought to achieve compatibility with these commercial universal colorants by including in the latex paint formulations substantial amounts of multicomponent dispersant systems. Development of a latex paint composition which has a full range of colorant compatibility would be a significant technical accomplishment.

It has been discovered in accordance with this invention that excellent paint tint colorant compatibility and development is obtained in polyvinyl acetate latex white paint base compositions containing a white pigment and a dispersing agent, by the addition of a small amount, effective as a colorant dispersant, of an ammonium salt of a partial ester of a styrene-maleic anhydride polymer esterified to about 75 to 100% half ester with an alkylphenyl ether alcohol of the formula

R—C$_6$H$_4$—(OCH$_2$CH$_2$)$_x$—OH where R is alkyl of 8 to 9 carbon atoms and $x$ is 1 to 30, the styrene-maleic anhydride polymer prior to esterification containing a molar ratio of polymerized styrene to polymerized maleic anhydride of about 1:1 to 4:1, preferably of about 1:1, and having an average molecular weight of about 600 to 5000, preferably about 1500 to 2000.

It is preferred that $x$ in the formula be at least 2, such as about 5 or 6 to 14 or 15. R is preferably octyl, such as tertiary-octyl. These alkylphenyl polyethoxy alcohols include octylphenyl polyethoxy alcohol containing 9 to 10 ethoxy groups which is a well known commercial product (Triton X–100). It is produced by the reaction of t-octylphenol with ethylene oxide and can be represented by the formula:

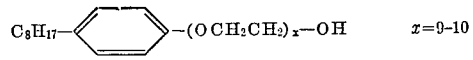

C$_8$H$_{17}$—⟨ ⟩—(OCH$_2$CH$_2$)$_x$—OH        $x$=9–10

The alkylphenyl polyethoxy alcohols also can be named alkylphenoxy polyethoxyethanols represented by the formula:

R—C$_6$H$_4$O—(CH$_2$CH$_2$O)$_x$—H where R and $x$ are as aforesaid. Thus octylphenyl polyethoxy alcohol also can be named octylphenoxy polyethoxyethanol represented by the formula:

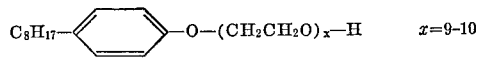

C$_8$H$_{17}$—⟨ ⟩—O—(CH$_2$CH$_2$O)$_x$—H        $x$=9–10

Optimum color development is obtained when the dispersing agent comprises a small effective amount of an ammonium salt of a partial ester of a styrene-maleic anhydride polymer esterified to about 75 to 100% half ester with an alkyl ether of ethylene glycol or of diethylene glycol, where alkyl is 1 to 8 carbon atoms, such as the monobutyl ether of ethylene glycol, and the styrene-maleic anhydride polymer prior to esterification contains a molar ratio of polymerized styrene to polymerized maleic anhydride of about 1:1 to 1:4, preferably about 1:1, and has an average molecular weight of about 600 to 5000, preferably about 1500 to 2000.

A small effective amount of an ammonium salt of the alkylphenyl ethoxy alcohol partial ester of the styrene-maleic anhydride polymer can be added and incorporated by stirring into the polyvinyl acetate white paint base composition at the time the white paint base composition is formulated or afterwards prior to the addition of the paint tint colorant. The amount of the ammonium salt of the alkylphenyl ethoxy alcohol partial ester of the styrene-maleic anhydride polymer, based on 100% active basis, i.e., non-volatile resin, may vary from about 0.5% to 5% or more by weight of the pigment in the white paint base composition. Usually this ammonium salt of the alkylphenyl ethoxy alcohol partial ester, based on 100% active basis, i.e. non-volatile resin, is about 0.5 to 3% and preferably about 1% to 2% by weight of the pigment. Only an amount of the ammonium salt of this alkylphenyl ethoxy alcohol partial ester need be used which is sufficient to effectively disperse the paint tint colorant without flocculation, although more can be used if desired.

To obtain optimum results, it is desirable to incorporate a small amount of the ammonium salt of the alkyl ether glycol partial ester of the styrene-maleic anhydride polymer during the pigment dispersion process of the paint making operation. The amount of the ammonium salt of the alkyl ether glycol partial ester, based on this partial ester non-volatile resin, may vary from about 0.5% to 5% or more by weight of the pigment in the white paint base composition. Usually this ammonium salt of the alkyl ether glycol partial ester, based on 100% active base, i.e. non-volatile resin, is about 0.5 to 2%, and preferably about 1 to 1.5%, by weight of the pigment to obtain optimum results, although more can be used, if desired.

The ammonium salt of the alkylphenyl ethoxy alcohol partial ester and the ammonium salt of the alkyl ether glycol partial ester can be separately introduced, or mixed together and introduced during the pigment dispersion process. The ratio of the ammonium salt of the alkylphenyl ethoxy alcohol partial ester to the ammonium salt of the alkyl ether glycol partial ester, on a 100% active basis, is usually about 0.5:1 to 2:1 and preferably about 1.2:1 to 1:1. However, the ammonium salt of the alkylphenyl ethoxy alcohol partial ester can be introduced as an additive after the pigment is dispersed with the ammonium salt of the alkyl ether glycol partial ester.

Any paint tint colorant, such as the various commercial paint tint colorants, can be dispersed in polyvinyl acetate latex white paint base formulations containing the alkylphenyl ethoxy alcohol partial esters of styrene-maleic anhydride polymer in accordance with this invention. These paint tint colorants are usually used in amounts of about 1 to 16 oz. and preferably about 4 to 8 oz. per gallon of polyvinyl acetate latex white paint base formulation.

Styrene and maleic anhydride can be polymerized to form low molecular weight polymers for use in this invention by conventional polymerization methods. Solution polymerization methods can be employed where the monomers are polymerized in a suitable solvent using as a polymerization catalyst a free-radical catalyst, such as a peroxide, preferably benzoyl peroxide, dicumyl peroxide or an alkyl peroxy dicarbonate, at a temperature of about 75 to 300° C. or more. Suitable solvents include the aromatic hydrocarbon solvents, such as cumene, p-cymene, xylene, toluene, etc. Other suitable solvents are the ketones, such as methylethyl ketone. A preferred manner of carrying out the polymerization is by what is known as incremental feed addition. By this method the monomers and catalyst are first dissolved in a portion of the solvent in which the polymerization is to be conducted and the resulting solution fed in increments into a reactor containing solvent heated to reaction temperature, usually the reflux temperature of the mixture.

When an aromatic solvent is employed as the solvent for the polymerization, the formation of the polymer causes a heterogeneous system, the polymer layer being the heavier layer and recoverable by merely decanting the upper aromatic solvent layer and drying. On the other hand, when a ketone is the solvent, the formed copolymer is usually soluble in the solvent media so that recovery of the product necessitates a solvent-stripping operation. It is preferred that the polymer contain a molar ratio of polymerized styrene to polymerized maleic anhydride of about 1:1 although ratios of up to about 4:1 can be obtained by adjusting the mole ratio of styrene to maleic anhydride in the polymerization reaction. These low molecular weight polymers have molecular weights of about 600 to 5000, preferably about 1500–2000.

The partial esters of these styrene-maleic anhydride polymers esterified to about 75 to 100% half-ester respectively with the alkylphenyl ethoxy alcohol and with the alkyl ether glycol can be prepared in any conventional manner. By 100% half-ester is meant that half of the total number of carboxyl groups in the styrene-maleic anhydride polymer are esterified leaving the remaining half of the carboxyl groups unesterified and available for forming ammonium salt groups. The partial ester of styrene-maleic anhydride polymer with tertiary octylphenyl polyethoxy alcohol containing 9 to 10 ethoxy groups (Triton X–100) is prepared as follows:

EXAMPLE A 100 grams of a styrene-maleic anhydride polymer, having a 1:1 ratio of styrene to moleic anhydride and a molecular weight range of 1600–1800 with the average number of styrene-maleic anhydride repeating units being about 8–9, is charged to a reaction kettle with 262 grams of the tertiary-octylphenyl polyethoxy alcohol containing 9–10 ethoxy groups (Triton X–100). The reaction kettle is fitted with a stirrer, thermometer, nitrogen sparge tube and condenser. Heat is gradually applied for 1½–2 hours to a reaction temperature of 340–350° F. This reaction temperature is held for 2½–3 hours, at which time the reaction is terminated.

The percent of half ester, based on acid number of the product, is 94% half ester of the styrene-maleic anhydride polymer esterified with the tertiary-octylphenyl polyethoxy alcohol. (Triton X–100.) The physical characteristics of this styrene-maleic anhydride partial ester of octylphenyl polyethoxy alcohol are as follows:

Form—Viscous liquid
Viscosity (Gardner-Holdt at 25° C.):
   87.5% NVR in xylene—M
   62.5% NVR in xylene—B
Color (Gardner)—13
Acid number—68.0
Specific viscosity at 30° C. (10 gms./100 ml. acetone)— 0.6467
Solubility—Readily soluble in aqueous ammonia solution and in xylene.

The ammonium salt of this partial ester is prepared as follows:

EXAMPLE B 110 grams of the partial ester of Example A and 220 grams of 28% ammonium hydroxide with 430 grams of water are charged to a reaction kettle fitted with stirrer, thermometer and condenser. These materials are heated to 110–130° F. and held at this temperature for approximately one hour. The pH of the water solution containing 14.5% of the soluble ammonium salt of the partial ester as non-volatile solid is 8.5–9.5.

EXAMPLE C

The 1:1 styrene-maleic anhydride polymer having a molecular weight of 1600–1800 is esterified to about 100% half ester with monobutyl ether of ethylene glycol (Butyl Cellosolve) in accordance with the general esterification procedure set forth in Example A. A hydrolyzed solution of the ammonium salt of this partial ester is prepared as follows: 320 parts of the above partial ester of 1:1 styrene-maleic anhydride polymer esterified to about 100% half ester with monobutyl ether of ethylene glycol (Butyl Cellosolve) is charged to a reaction kettle containing an amount of water to give 35% solids concentration. The partial ester is added slowly with agitation to avoid formation of clumps of the partial ester. The temperature of the water-partial ester slurry is raised to 60–70° C. and maintained at this temperature. After the 60–70° C. temperature is obtained, 60 parts of ammonium hydroxide solution at 26° Bé. is slowly added to the water-partial ester and reacted until the partial ester is in solution as the ammonium salt of the partial ester. The pH of the resulting hydrolyzed 35% solution of the ammonium salt of the partial ester of styrene-maleic anhydride polymer with monobutyl ether of ethylene glycol is about 9.0–9.5.

For purposes of tests two polyvinyl acetate latex white paint base formulations A and B are prepared as shown in Table I and employed in the examples. However, any polyvinyl acetate latex white paint base composition containing a white pigment and a dispersing agent can be employed in the present invention.

TABLE I.—POLYVINYL ACETATE LATEX WHITE PAINT BASE FORMULATIONS

| | A, lbs. | B, lbs. |
|---|---|---|
| Water | 261 | 261 |
| Hydrolyzed ammonium salt of monobutyl ether of ethylene glycol partial ester of styrene-maleic anhydride polymer of Example C (35% solution) | 12.4 | |
| Commercial anionic polymeric dispersing agent (Tamol 731) | | 4.3 |
| Commercial nonionic surface-active agent (addition product of ethylene oxide to polypropylene glycols) (Pluronic L-62) | | 3.8 |
| Commercial titanium dioxide pigment | 150 | 150 |
| Commercial extender white pigment of magnesium silicates | 150 | 150 |
| Silica No. 1160 | 50 | 50 |

The above portions of the formulations are dispersed by stirring in a Waring Blendor and then there is added:

| | A, lbs. | B, lbs. |
|---|---|---|
| Commercial polyvinyl acetate emulsion | 285 | 285 |
| Commercial methylcellulose thickening agent, 4% aqueous solution | 139 | 139 |
| Diethylene glycol | 15 | 15 |
| Monoethylether of diethylene glycol (Carbitol) | 25 | 25 |
| Commercial phenyl mercuric acetate | 2.5 | 2.5 |
| Total | 1,089.9 | 1,085.6 |

Formulation A was prepared by using the hydrolyzed 35% solution of the ammonium salt of ethylene glycol monobutyl ether ester of styrene-maleic anhydride polymer of Example C as the pigment dispersant during the physical dispersion process in the Waring Blendor.

Formulation B was prepared by using a commercial dispersant system of an anionic polymeric dispersing agent (Tamol 731) and a nonionic surface-active agent, addition product of ethylene oxide to polypropylene glycols (Pluronic L-62), as the pigment dispersant during the physical dispersion process in the Waring Blendor.

Example I

Five samples were prepared of the polyvinyl acetate latex white paint base formulation A, each of which contained the hydrolyzed ammonium salt of the ethylene glycol monobutyl ether ester of styrene-maleic anhydride polymer, prepared as in Example C, and used as the pigment dispersant during the physical dispersion process in the Waring Blendor.

Sample 1 contained the ammonium salt of ethylene glycol monobutyl ether ester of styrene-maleic anhydride polymer, used as the pigment dispersant during the physical dispersion process in the Waring Blendor, and no additional dispersant was added thereto.

Additional dispersants were added to each of samples 2, 3, 4 and 5 and incorporated by stirring. The additional dispersant added to sample 2 was the octylphenyl polyethoxy alcohol containing 9 to 10 ethoxy groups (Triton X-100), not the ester, in the ratio of 3.7 lbs. per 1090 lbs. of paint.

The additional dispersant added to sample 3 was the hydrolyzed ammonium salt solution (37% non-volatile resin) of the 1:1 styrene-maleic anhydride polymer, not the ester, in the ratio of 1.4 lbs., non-volatile resin per 1090 lbs. of paint.

The additional dispersant added to sample 4 was a physical blend of the octylphenyl polyethoxy alcohol (Triton X-100) in the ratio of 3.7 lbs. and the hydrolyzed ammonium salt solution (37% non-volatile resin) of the 1:1 styrene-maleic anhydride polymer in the ratio of 1.4 lbs. non-volatile resin per 1090 lbs. of paint.

The additional dispersant added to sample 5 was the hydrolyzed solution (14.5% non-volatile resin) of the ammonium salt of the octylphenyl polyethoxy alcohol (Triton X-100) ester of the 1:1 styrene-maleic anhydride polymer of Example B of this invention in the ratio of 5 lbs. non-volatile resin per 1090 lbs. of paint.

There was added to each of samples 1 to 5, after incorporation of additional dispersants to samples 2 to 5, as set forth above, 8 oz. of a commercial lampblack paint tint colorant per gallon of polyvinyl acetate latex white paint base formulation A.

Drawdowns and flocculation "rub-ups" were made with each of the five lampblack colored samples with the results shown in the following table.

TABLE II

| Sample | Dispersant | Colorant flocculation |
|---|---|---|
| 1 | Hydrolyzed ammonium salt of ethylene glycol monobutyl ether ester of styrene-maleic anhydride polymer | Very extreme |
| | Additional dispersant | |
| 2 | Octylphenyl polyethoxy alcohol (Triton X-100) | Very extreme. |
| 3 | Hydrolyzed ammonium salt of styrene-maleic anhydride polymer | Do. |
| 4 | Physical blend of octylphenyl polyethoxy alcohol (Triton X-100) and the hydrolyzed ammonium salt of styrene-maleic anhydride polymer | Extreme. |
| 5 | Ammonium salt of octylphenyl polyethoxy alcohol (Triton X-100) ester of styrene-maleic anhydride polymer of this invention | None. |

Optimum color development with no flocculation was achieved in sample 5 by using the ammonium salt of the octylphenyl polyethoxy alcohol ester of styrene-maleic anhydride polymer in the polyvinyl acetate latex white paint base formulation A which contained the hydrolyzed ammonium salt of ethylene glycol monobutyl ether ester of styrene-maleic anhydride polymer as a pigment dispersant. Thus this combination of dispersants is highly effective. However, sample 1 of formulation A containing only the hydrolyzed ammonium salt of ethylene glycol monobutyl ether ester of styrene-maleic anhydride polymer gave very extreme flocculation.

Example II

Five samples were prepared of the polyvinyl acetate latex white paint base formulation B, each of which contained a commercial anionic polymeric dispersing agent (Tamol 731) and a commercial nonionic surface-active agent, addition product of ethylene oxide to polypropylene glycols (Pluronic L-62) used as the pigment dispersant system during the physical dispersion process in the Waring Blendor.

Sample 1 contained the commercial anionic polymeric dispersing agent (Tamol 731) and the commercial non-ionic surface-active agent, addition product of ethylene oxide to polypropylene glycols (Pluronic L–62), used as the pigment dispersant during the physical dispersion process in the Waring Blendor and no additional dispersant was added thereto.

Additional dispersants were added to each of samples 2, 3, 4, and 5 and incorporated by stirring. The additional dispersant added to sample 2 was the hydrolyzed ammonium salt solution (37% non-volatile resin) of the 1:1 styrene-maleic anhydride polymer, not the ester, in the ratio of 1.4 lb. non-volatile resin per 1085 lbs. of paint.

The additional dispersant added to sample 3 was the octylphenyl polyethoxy alcohol containing 9 to 10 ethoxy groups (Triton X–100), not the ester, in the ratio of 3.7 lbs. per 1085 lbs. of paint.

The additional dispersant added to sample 4 was a physical blend of the octylphenyl polyethoxy alcohol (Triton X–100) in the ratio of 3.7 lbs. and the hydrolyzed ammonium salt solution (37% non-volatile resin) of the 1:1 styrene-maleic anhydride polymer in the ratio of 1.4 lbs. non-volatile resin per 1085 lbs. of paint.

The additional dispersant added to sample 5 was the hydrolyzed solution (14.5% non-volatile resin) of the ammonium salt of the octylphenyl polyethoxy alcohol (Triton X–100) ester of the 1:1 styrene-maleic anhydride polymer of Example B of this invention in the ratio of 5 lbs. non-volatile resin per 1085 lbs. of paint.

There was added to each of samples 1 to 5, after the incorporation of additional dispersants to samples 2 to 5 as set forth above, 8 oz. of a commercial sienna paint tint colorant per gallon of polyvinyl acetate latex white paint base formulation B.

Drawdowns and flocculation "rub-ups" were made with each of the five sienna colored samples with the results shown in the following table.

hydride polymer and octylphenyl polyethoxy alcohol causes colorant flocculation and thus are not effective as colorant dispersants. These tests show that the ammonium salt of the octylphenyl polyethoxy alcohol ester of styrene-maleic anhydride polymer of this invention is the effective colorant dispersant.

Other paint tint colorants, monastral red and medium yellow, were dispersed in polyvinyl acetate latex white paint base formulations with the ammonium salt of the octylphenyl polyethoxy alcohol ester of styrene-maleic anhydride polymer of this invention and gave similar results.

It is claimed:

1. A polyvinyl acetate latex white paint base composition containing a paint tint colorant dispersant composition which comprises a mixture of an ammonium salt of a partial ester of a styrene-maleic anhydride polymer esterified to about 75 to 100% half ester with an alkylphenyl ether alcohol of the formula $$R\text{—}C_6H_4\text{—}(OCH_2CH_2)_x\text{—}OH$$

where R is alkyl of 8 to 9 carbon atoms and $x$ is 1 to 30, and an ammonium salt of a partial ester of a styrene-maleic anhydride polymer esterified to about 75 to 100% half ester with an alkyl ether glycol selected from the group consisting of alkyl ethers of ethylene glycol and of diethylene glycol wherein alkyl is about 1 to 8 carbons, each of said styrene-maleic anhydride polymers prior to esterification containing a molar ratio of polymerized styrene to polymerized maleic anhydride of about 1:1 to 4:1 and having an average molecular weight of about 600 to 5000, and the ratio of said half ester with an alkylphenyl ether alcohol to said half ester with an alkyl ether glycol being about 0.5:1 to 2:1, and wherein each of said half esters is present in an amount of about 0.5 to 5.0 percent by weight with respect to the white pigment in said polyvinyl acetate latex white paint composition.

2. A paint tint colorant dispersant composition of claim 1 wherein R in the formula of said alkylphenyl

TABLE III

| Sample | Dispersant | Colorant flocculation |
|---|---|---|
| 1 | Commercial anionic polymeric dispersing agent (Tamol 731) and commercial nonionic surface-active agent (Pluronic L–62) | Very extreme |
| | Additional dispersant | |
| 2 | Hydrolyzed ammonium salt of styrene-maleic anhydride polymer | Very extreme |
| 3 | Octylphenyl polyethoxy alcohol (Triton X–100) | Do. |
| 4 | Physical blend of octylphenyl polyethoxyl alcohol Triton X–100 and the hydrolyzed ammonium salt of styrene-maleic anhydride polymer | Do. |
| 5 | Ammonium salt of octylphenyl polyethoxy alcohol (Triton X–100) ester of styrene-maleic anhydride polymer of this invention | None. |

Optimum color development with no flocculation was achieved in sample 5 by using the ammonium salt of the octylphenyl polyethoxy alcohol ester of styrene-maleic anhydride polymer in the polyvinyl acetate latex white paint base formulation B which contained the commercial anionic polymeric dispersing agent and the commercial non-ionic surface-active agent as a pigment dispersant. Thus the colorant dispersant of this invention, the ammonium salt of the octylphenyl polyethoxy alcohol ester of styrene-maleic anhydride polymer, is generally effective in commercial polyvinyl acetate latex white paint base compositions containing a white pigment and conventional dispersing agents for the pigment. However, sample 1 of formulation B containing only the commercial dispersing agent for the pigment gave very extreme flocculation.

In the examples, it is shown that the octylphenyl polyethoxy alcohol, the hydrolyzed ammonium salt of the styrene-maleic anhydride polymer, and a mere physical blend of the ammonium salt of the styrene-maleic anhydride polymer and octylphenyl polyethoxy alcohol causes colorant flocculation and thus are not effective ether alcohol is tertiary-octyl, $x$ is 9 to 10, said alkyl ether glycol is monobutyl ether of ethylene glycol, and each of said styrene-maleic anhydride polymers prior to esterification contains a molar ratio of polymerized styrene to polymerized maleic anhydride of about 1:1 and has an average molecular weight of about 1500 to 2000.

3. In a polyvinyl acetate latex white paint base composition containing a white pigment and a dispersing agent for said white pigment, the improvement which comprises said dispersing agent for said white pigment comprising from about 0.5 to 5% by weight of said white pigment of an ammonium salt of a partial ester of a styrene-maleic anhydride polymer esterified to about 75 to 100% half-ester with monobutyl ether of ethylene glycol and an additional dispersing agent therein of about 0.5 to 5% by weight of said white pigment to effectively disperse a paint tint colorant in said white paint base composition without flocculation, said additional dispersing agent being an ammonium salt of a partial ester of a styrene-maleic anhydride polymer esterified to about 75 to 100% half-ester with tertiary octylphenyl polyethoxy alcohol of the formula

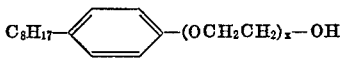

where $x$ is 9–10, and each of said styrene-maleic anhydride polymers prior to esterification contains a molar ratio of polymerized styrene to polymerized maleic anhydride of about 1:1 and has an average molecular weight of about 1500 to 2000.

4. In the polyvinyl acetate latex white paint base composition of claim 3, wherein said white pigment comprises titanium dioxide pigment, a paint tint colorant dispersed therein in amount of about 1 to 16 oz. per gallon of said composition.

References Cited
UNITED STATES PATENTS

| | | | |
|---|---|---|---|
| 2,647,094 | 7/1953 | Hahn | 260—29.6 RW XU |
| 3,207,718 | 9/1965 | Zimmerman et al. | 260—29.6 RW UX |
| 3,363,029 | 1/1968 | Verdol et al. | 260—29.6 RW X |
| 3,380,944 | 4/1968 | Kay et al. | 260—29.6 RW X |
| 3,446,783 | 5/1969 | Kay et al. | 260—29.6 RW UX |

DONALD J. ARNOLD, Primary Examiner

J. B. LOWE, Assistant Examiner

U.S. Cl. X.R.

260—296 RW